(12) United States Patent
Fosler

(10) Patent No.: US 6,762,570 B1
(45) Date of Patent: Jul. 13, 2004

(54) MINIMIZING STANDBY POWER IN A DIGITAL ADDRESSABLE LIGHTING INTERFACE

(75) Inventor: Ross M. Fosler, Chandler, AZ (US)

(73) Assignee: Microchip Technology Incorporated, Chandler, AZ (US)

( * ) Notice: Subject to any disclaimer, the term of this patent is extended or adjusted under 35 U.S.C. 154(b) by 626 days.

(21) Appl. No.: 09/832,286

(22) Filed: Apr. 10, 2001

(51) Int. Cl.[7] .................................................. G06F 1/26
(52) U.S. Cl. ........................ 315/312; 315/294; 315/320
(58) Field of Search ............................... 315/291–296, 315/224, 225, 307, 362, 312, 318, 320, 324

(56) References Cited

U.S. PATENT DOCUMENTS 6,025,679 A * 2/2000 Harper et al. ............... 315/312
6,043,611 A * 3/2000 Gradzki et al. ............. 315/291
6,138,241 A * 10/2000 Ecket et al. ................ 315/320

* cited by examiner

*Primary Examiner*—Don Wong
*Assistant Examiner*—Wilson Lee
(74) *Attorney, Agent, or Firm*—Baker Botts L.L.P.

(57) ABSTRACT

A Digital Addressable Lighting Interface (DALI) receives power from a high voltage power circuit when in a standby mode. The DALI remains in a standby mode until signal activity on a DALI bus is detected, or the DALI may periodically switch from the standby mode to an active mode so as to sample any activity on the DALI bus. If no activity is detected then the DALI returns to the standby mode. If DALI bus activity is detected then the DALI remains in the active mode. The DALI receives power from a power controller when in the active mode. The DALI remains in the active mode so long as the power controller is supplying power to an electrical device.

39 Claims, 6 Drawing Sheets

MINIMIZING STANDBY POWER IN A DIGITAL ADDRESSABLE LIGHTING INTERFACE

FIELD OF THE INVENTION

The present invention relates generally to control and status of building lighting and power systems, and more particularly to a minimizing standby power in a digital addressable lighting interface (DALI).

BACKGROUND OF THE INVENTION TECHNOLOGY

The demands imposed on lighting systems have changed considerably in recent years. Heretofore, switching individual or groups of luminaries on and off used to be sufficient, however, the focus for today and in the future will be on dynamic lighting. Energy conservation, more flexibility of use, increased life and reduced maintenance costs of lighting systems require lighting scene control. To create lighting scenes, luminaries generally are assigned to a plurality of groups. In addition, an end user preferably wants the option of controlling his or her luminaries. If installations having this type of flexibility are integrated into a building management system, there is also a need for simple check-back of operational status as well as global on/off control.

One method of implementing flexibility in the control of luminaries has been achieved using a new industrial standard for addressable digital lighting control called "Digital Addressable Lighting Interface" or "DALI." The DALI standard specifies how to control and monitor the status of individual and group addressable lighting equipment such as electronic ballasts and illumination sensors The DALI standard uses a two wire low voltage control circuit for addressing, controlling and monitoring the status of connected DALI compliant devices. The DALI standard also specifies how to determine the status of the amount of light of addressed luminaries as well as information from fire and security sensors.

DALI compliant electronic ballasts are now being manufactured which comprise all circuitry necessary to control the power to and lighting levels of a connected fluorescent lamp(s). The only connections required to these DALI compliant ballasts are power and a low voltage two wire DALI control circuit. Each DALI compliant ballast also has a unique address as well as being assignable to a group address. These control and address capabilities allow a DALI compliant lighting system to individually control the light level of each the luminaries as well as easily controlling light levels for groups of luminaries.

The DALI messages are serial data streams and comply with a bi-phase, or Manchester, coding in which the bit values "1" and "0" are presented as two different voltage levels, e.g., 16 volts and 0 volts, respectively. The coding includes error detection. A power source is provided to generate the voltage level. DALI interfaces are connected to a two wire control bus which is common to all or groups of DALI interfaces. Each DALI interface receives information by determining the voltage changes representing the bit values, and transmits information by either not clamping a voltage or clamping (shorting) the voltage across the two wire DALI control bus.

DALI messages consist of an address part and a command part (hereinafter "DALI protocol"). The address part determines for which DALI device the message is intended. All DALI devices may execute commands with broadcast addresses. Sixty-four unique addresses are available plus sixteen group addresses. A particular DALI device may belong to more than one group. The light level is defined in DALI messages using an 8-bit number. The value "0" (zero) means that the lamp is not lit. The DALI standard determines the light levels so that they comply with the logarithmic curve in which the human eye observes the light level change in a linear fashion. All DALI compliant ballasts and controllers adhere to the same logarithmic curve irrespective of their absolute minimum level. The DALI standard determines the light levels over a range of 0.1 percent to 100 percent, e.g., level 1 of the DALI standard corresponds to a light level of 0.1 percent. The DALI protocol and the DALI two wire hardware interface is unique for controlling and monitoring power devices such as lighting.

The DALI compliant ballasts and controllers do not require power when the associated lamp(s) are off. However, the DALI hardware interface requires a power source for monitoring address and control information on the DALI bus even when the associated ballast and power controller are off. Thus an independent power supply is required for each DALI hardware interface. A separate power supply for each DALI hardware interface requires space and may amount to a significant percentage of the cost of the DALI hardware interface. Also, having to continuously supply power to each DALI hardware interface amounts to a significant amount of power in a building having hundreds of light figures.

Therefore, as DALI compliant devices and lighting systems become more prevalent, what is needed is a way to minimize standby power when DALI compliant devices are inactive.

SUMMARY OF THE INVENTION

The invention overcomes the above-identified problems as well as other shortcomings and deficiencies of existing technologies by providing a system, method and apparatus for minimizing standby power in a digital addressable lighting interface (hereinafter "DALI") when an associated DALI compliant device is off or inactive. Exemplary embodiments of the present invention include a DALI having a standby mode and an active mode. When in the active mode, power is supplied to the DALI by an associated power controller, and when in the standby mode, power is supplied to the DALI by a high resistance voltage dropping resistor connected to a high voltage DC source rectified from the AC line voltage power source. The power source may also be direct current (DC) in which case no rectification would be necessary. The standby power for the DALI may also be supplied by either a low power step down transformer or a high impedance voltage dropping element, e.g., a capacitor or an inductor, connected to the AC line voltage power source in combination with a rectifying diode. The DALI uses less current when in the standby mode than when in the active mode. Power is efficiently supplied from the power controller when the DALI is in the active mode, and when in the standby mode the very low current requirements of the DALI draw minimal power from the AC line voltage power source even though the voltage drop across the voltage dropping resistor is substantial. The DALI may change from the standby mode to the active mode upon detection of a DALI signal level transition on the DALI bus or at predetermined sample time intervals.

In accordance with the exemplary embodiments, the present invention is directed to an apparatus for minimizing standby power in a digital addressable lighting interface (DALI), said apparatus comprising: A power controller adapted for connection to a power source and an electrical device. A processor coupled to said power controller, wherein said processor controls the operation of said power controller, whereby when said power controller is on said processor receives power therefrom. A standby power pickup adapted for connection to the power source and connected to said processor, whereby said standby power pickup supplies power to said processor when said power controller is off. And a digital addressable lighting interface (DALI) bus interface adapted for connection to a DALI bus, said DALI bus interface is connected to said processor, wherein said processor is in a standby mode when said power controller is off and there is no signaling activity on the DALI bus, and said processor is in an active mode when said power controller is on or DALI information is detected on the DALI bus.

The DALI information is detected by said processor determining that a signal level change has occurred on the DALI bus, or said processor periodically turns on said power controller and checks the DALI bus for information.

The processor may turn on said power controller for less time than a time period between checking the DALI bus for information. The power controller may be turned on for less than 75 percent of the time period between checking the DALI bus for information. The power controller may be turned on for less than 50 percent of the time period between checking the DALI bus for information. The power controller may be turned on for less than 25 percent of the time period between checking the DALI bus for information. The power controller may be turned on for less than ten percent of the time period between checking the DALI bus for information. The power controller may be turned on for less than five percent of the time period between checking the DALI bus for information.

The standby power pickup may be a resistor, a capacitor and diode, an inductor and diode, or a step down transformer and a diode.

The power controller may include a power rectifier adapted for coupling to the power source and for rectifying. A power factor correction circuit may be used to improve the electrical device power factor. The DALI bus interface may comprise an optically isolated transmitter and receiver.

The present invention is also directed to an apparatus for minimizing standby power in a digital addressable lighting interface (DALI), said apparatus comprising: A power controller adapted for connection to a power source and an electrical device. A processor coupled to said power controller, wherein said processor controls the operation of said power controller, whereby when said power controller is on said processor receives power therefrom. A standby power pickup adapted for connection to the power source and connected to said processor, whereby said standby power pickup supplies power to said processor when said power controller is off. And a digital addressable lighting interface (DALI) bus interface adapted for connection to a DALI bus, said DALI bus interface is connected to said processor, wherein said processor is in a standby mode when said power controller is off and there is no signaling activity on the DALI bus, and said processor is in an active mode when said power controller is on or when there is signaling activity on the DALI bus.

The present invention is also directed to an apparatus for minimizing standby power in a digital addressable lighting interface (DALI), said apparatus comprising: A power controller adapted for connection to a power source and an electrical device. A processor coupled to said power controller, wherein said processor controls the operation of said power controller, whereby when said power controller is on said processor receives power therefrom. A standby power pickup adapted for connection to the power source and connected to said processor, whereby said standby power pickup supplies power to said processor when said power controller is off. And a digital addressable lighting interface (DALI) bus interface adapted for connection to a DALI bus, said DALI bus interface is connected to said processor, wherein said processor is in a standby mode when said power controller is off, and said processor is in an active mode when said power controller is on or at periodic time intervals.

The present invention is also directed to a method of operation for minimizing standby power in a digital addressable lighting interface (DALI), comprising the steps of: Providing a power controller adapted for connection to a power source and an electrical device. Controlling the operation of said power controller with a processor, wherein when said power controller is on said processor receives power therefrom. Providing power to said processor with a standby power pickup when said power controller is off, wherein said standby power pickup is adapted for connection to the power source. Providing a digital addressable lighting interface (DALI) bus interface adapted for connection to a DALI bus, said DALI bus interface being connected to said processor. And monitoring for signaling activity on the DALI bus, wherein said processor is in a standby mode when said power controller is off and there is no signaling activity on the DALI bus, and said processor is in an active mode when said power controller is on or there is signaling activity on the DALI bus.

The step of detecting signaling activity on the DALI bus is the step of determining that a signal level change has occurred on the DALI bus, or the processor periodically turning on said power controller and checking the DALI bus for information, wherein said processor turns on said power controller for less time than a time period between checking the DALI bus for information.

In addition, the present invention is directed to a system for minimizing standby power in a digital addressable lighting interface (DALI), said system comprising: A power controller connected to a power source and an electrical device. A processor coupled to said power controller, wherein said processor controls the operation of said power controller, whereby when said power controller is on said processor receives power therefrom. A standby power pickup adapted for connection to the power source and connected to said processor, whereby said standby power pickup supplies power to said processor when said power controller is off. And a digital addressable lighting interface (DALI) bus interface connected to a DALI bus, said DALI bus interface is connected to said processor, where in said processor is in a standby mode when said power controller is off and there is no signaling activity on the DALI bus, and said processor is in an active mode when said power controller is on or when there is signaling activity on the DALI bus.

The present invention is also directed to a system for minimizing standby power in a digital addressable lighting interface (DALI), said system comprising: A power controller connected to a power source and an electrical device. A processor coupled to said power controller, wherein said processor controls the operation of said power controller, whereby when said power controller is on said processor receives power therefrom. A standby power pickup connected to the power source and connected to said processor, whereby said standby power pickup supplies power to said processor when said power controller is off. And a digital addressable lighting interface (DALI) bus interface connected to a DALI bus, said DALI bus interface is connected to said processor, wherein said processor is in a standby mode when said power controller is off, and said processor is in an active mode when said power controller is on or at periodic time intervals.

The system may be used with an incandescent light, a fluorescent light, a high pressure gas electric discharge light, a low pressure gas electric discharge light, light emitting diode light and electroluminescent light. The system may also be used with a light damper on a window exposed to sunlight, remotely controllable window shades and remotely controllable window curtains. The system may also be used with a smoke detector, a fire detector, a motion detector, a light sensor, a temperature sensor and a humidity sensor. The system may further be connected to a building automation computer system.

A technical advantage of the present invention is very low power standby operation.

Another technical advantage is a cost savings in using an existing source of power from a power controller when active.

Another technical advantage is a reduction in the number of parts for a DALI.

A feature of the present invention is switching from a standby mode to an active mode when a DALI signal is detected.

Another feature is detection of the first edge of the DALI signal.

Another feature is sampling the DALI bus at a reduced duty cycle of active to is standby times.

An advantage of the present invention is reduced power usage when in a standby mode.

Another advantage is a reduction in the number of parts required.

Features and advantages of the invention will be apparent from the following description of the embodiments, given for the purpose of disclosure and taken in conjunction with the accompanying drawings.

BRIEF DESCRIPTION OF THE DRAWINGS

A more complete understanding of the present disclosure and advantages thereof may be acquired by referring to the following description taken in conjunction with the accompanying drawing, wherein.

Figure 1:
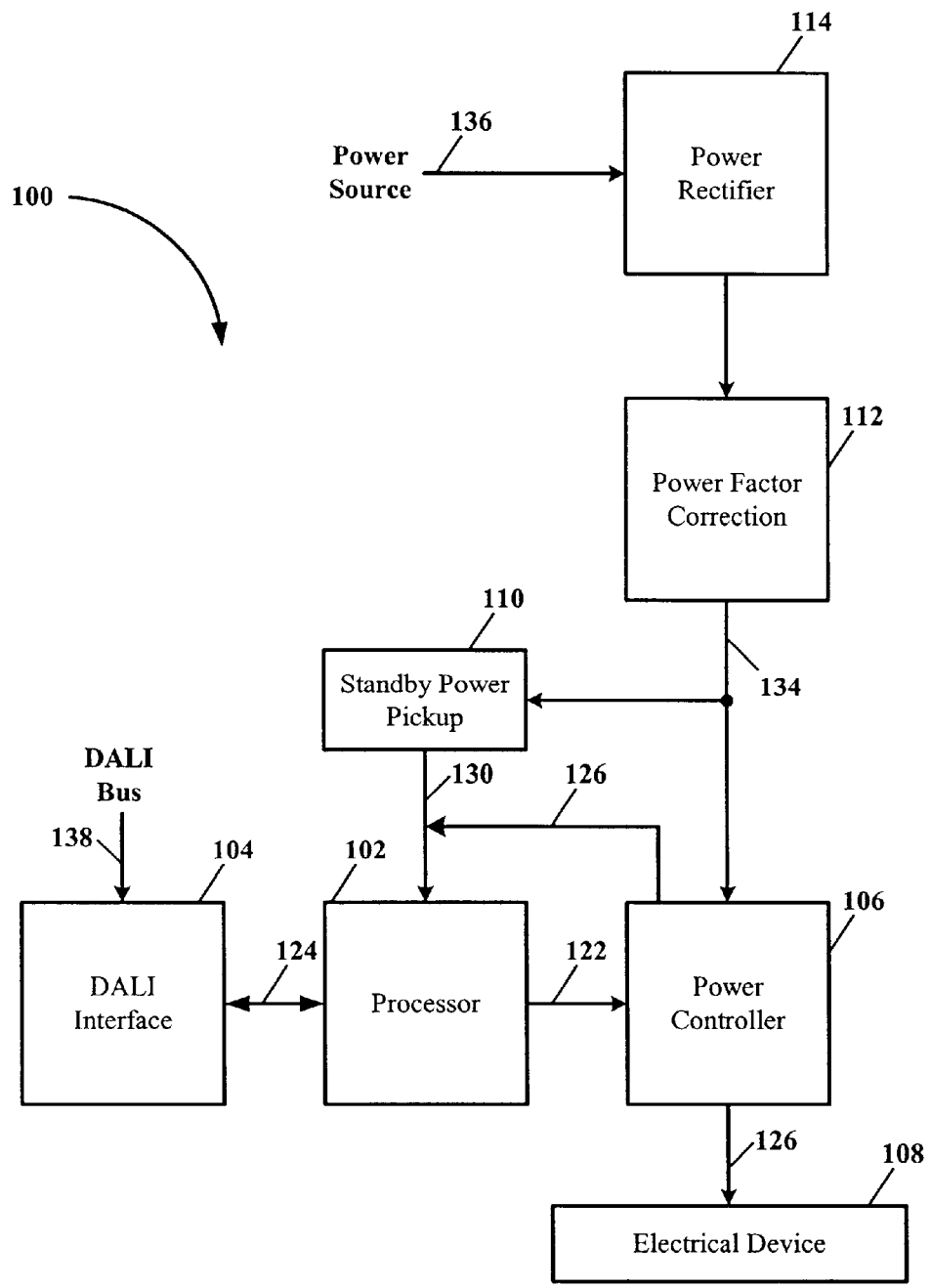
FIG. 1 illustrates a schematic block diagram of a DALI compliant electrical system, according to exemplary embodiments of the invention.

While the present invention is susceptible to various modifications and alternative forms, specific exemplary embodiments thereof have been shown by way of example in the drawing and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

The present invention is directed to a method, system and apparatus for minimizing standby power in a digital addressable lighting interface (hereinafter "DALI") when an associated DALI compliant device is off or inactive. Exemplary embodiments of the present invention include a DALI having a standby mode and an active mode. When in the active mode, power is supplied to the DALI by an associated power controller, and when in the standby mode, power may be supplied to the DALI by a high resistance voltage dropping resistor connected to a high voltage DC source rectified from the AC line voltage power source. The power source may also be direct current (DC) in which case no rectification would be necessary. The standby power for the DALI may also be supplied by either a low power step down transformer or a high impedance voltage dropping element, e.g., a capacitor or an inductor, connected to the AC line voltage power source in combination with a rectifying diode. The DALI uses less current when in the standby mode than when in the active mode. Power is efficiently supplied from the power controller when the DALI is in the active mode, and when in the standby mode the very low current requirements of the DALI draw minimal power from the AC line voltage power source even though the voltage drop across the voltage dropping resistor is substantial. The DALI may change from the standby mode to the active mode upon detection of a DALI signal level transition on the DALI bus or at predetermined sample time intervals, e.g., internals being from about 10 microseconds to about 208 microseconds. The active mode during any one of these sample time intervals may be shorter than the time interval, e.g., from about 4–5 microseconds. This short duration activation is not enough time to cause an electrical device to be activated.

Referring now to the drawings, the details of exemplary embodiments of the present invention are schematically illustrated. Like elements in the drawings will be represented by like numbers, and similar elements will be represented by like numbers with a different lower case letter suffix.

Referring to FIG. 1, depicted is a schematic block diagram of a DALI compliant electrical system, according to exemplary embodiments of the invention. The DALI compliant electrical system is generally represented by the numeral 100 and comprises a processor 102, an DALI bus interface 104, a power controller 106, an electrical device 108, a standby power pickup 110 and a power rectifier 114. A power factor correction circuit, 112 may also be included for improved power factor and enhanced operation (less operating current) of the DALI compliant electrical system 100. The processor 102 may be for example, but not limited to, a microcontroller, a microprocessor, a digital signal processor, a digital signal controller, an application specific integrated circuit (ASIC) and a programmable logic array (PLA). The electrical device 108 may be for example, but not limited to, an incandescent light, a fluorescent light, a high pressure gas electric discharge light, a low pressure gas electric discharge light, light emitting diode light and electroluminescent light.

An alternating current (AC) power source 136 provides electrical power for the electrical device 108. The AC power source 136 may be at a voltage, for example, of from about 110 volts to 277 volts phase to neutral, or 240 volts to 480 volts phase to phase. The power rectifier 114 converts the AC power source 136 voltage into high voltage direct current (DC) which is supplied to the power controller 106. The optional power factor correction circuit 112 preferably may be used to improve the power factor and reduce the current drawn by the electrical device 108.

The processor 102 is coupled to and controls the power controller 106 through a control circuit 122. The power controller 106 is adapted to supply operating power to the processor 102 through a low voltage power circuit 126. When not delivering power to the electrical device 108, the power controller 106 is shutdown. Therefore low voltage power at node 126 is no longer available for operation of the processor 102. Since the processor 102 controls the shutdown and power up of the power controller 106, the processor 102 must obtain power from a different source. Alternate low voltage power may be supplied by the standby power pickup 110 to the processor 102 on standby power circuit 130.

It is a feature of the invention that when the power controller 106 is not on (operational), the processor 102 goes into a standby mode of operation. The processor 102 requires less power in the standby mode. Therefore, the standby power pickup 110 is not required to supply much power. This is important when a resistance or impedance is used to drop the high voltage from the power rectifier 114 (power source 136 voltage) to the low voltage required by the processor 102.

The processor 102 may remain in the low power standby mode until information activity is detected on the DALI bus 138. In combination with the DALI bus interface 104, the processor 102 is capable of detecting a signal level transition representing information on the DALI bus 138 even when in the standby mode. Once the signal level transition is detected the processor 102 may go from the standby mode to the active mode and stay in the active mode until the received information is decoded.

In another exemplary embodiment, the processor 102 may periodically go from the standby mode to the active mode for determining if there is any information activity on the DALI bus 138. If such information activity is detected, then the processor 102 may remain in the active mode until the received information is decoded. If no information activity is detected, then the processor may return to the standby mode. Thus the processor 102 has an active mode duty cycle less than 100 percent, preferably less than 50 percent, and most preferably less than 25 percent. The power consumption of the processor 102 is proportional to this duty cycle.

Figure 2:
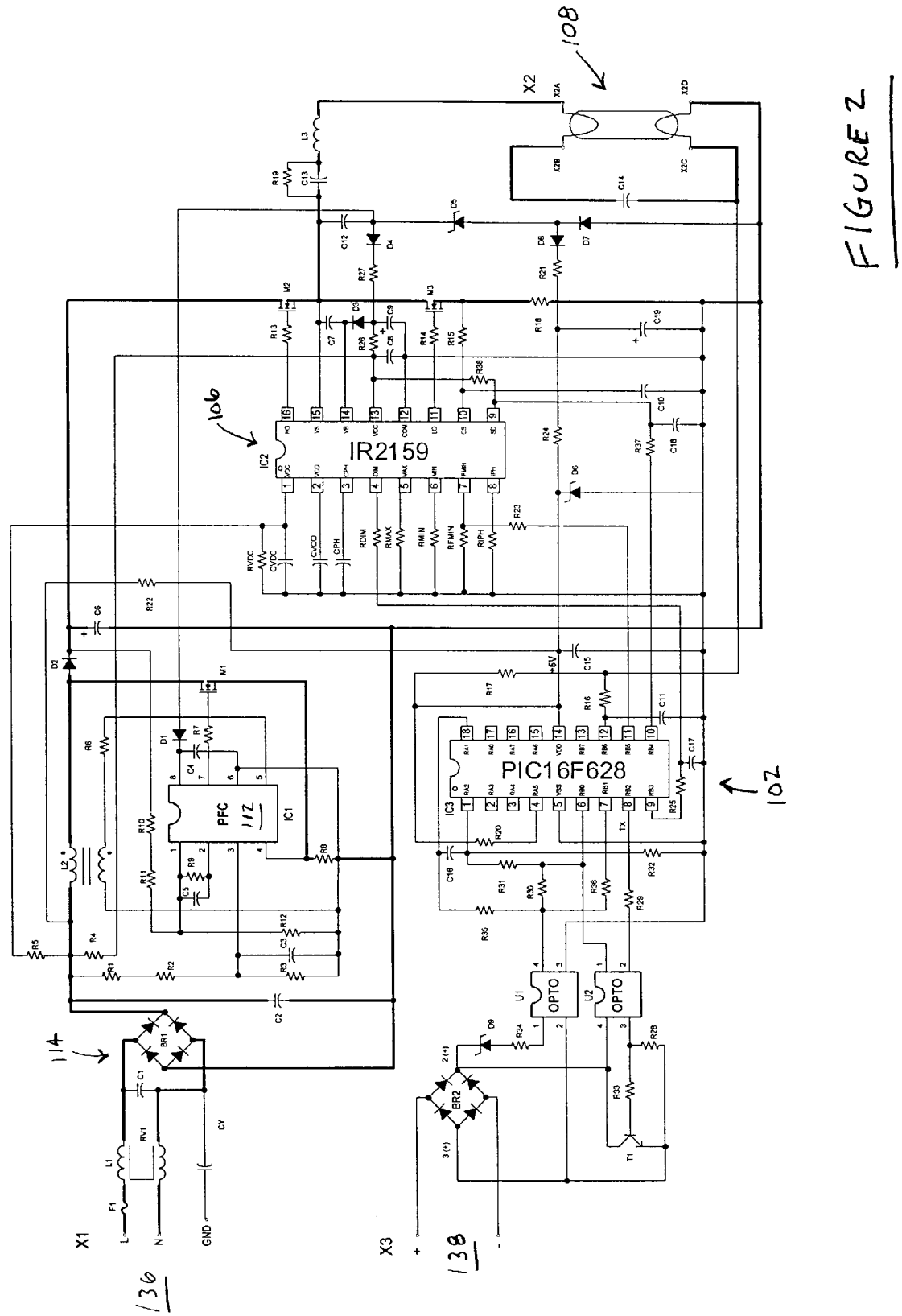
FIG. 2 illustrates an exemplary schematic circuit diagram of the DALI compliant electrical system of FIG. 1.

Referring to FIG. 2, depicted is an exemplary schematic circuit diagram of the DALI compliant electrical system of FIG. 1. The processor 102 may be for example, a Microchip PIC16F628. The power controller 106 may be for example, an International Rectifier IR2159. The DALI bus interface 104 may comprise diode bridge BR2, opto isolators U1 and U2, and transistor T1. The power rectifier 114 may be high voltage diode bridge BR1. The electrical device 108 may be for example, but not limited to, a fluorescent lamp(s). The circuit illustrated in FIG. 2 may be used in a DALI compliant dimmable lighting fixture that has reduced standby power when the lamp is off. The standby power pickup 110 may be resistor R22. The standby power pickup 110 may also be a capacitor or inductor (not illustrated) having an impedance at the AC power source 136 frequency appropriate for dropping the required voltage. When using an AC impedance, the standby power pickup would be connected ahead of the power rectifier 114 and a small diode would be used to rectify the AC into DC for the processor 102. A small step down transformer (not illustrated) may also be used instead of the resistor R22 or impedance by connecting the primary of the step down transformer to the AC power source 136 and the secondary, through a diode, to the processor 102 power node. An advantage of the step down transformer is even lower power dissipation of the DALI compliant electrical system 100 when the processor 102 is in the standby mode.

Figure 3:
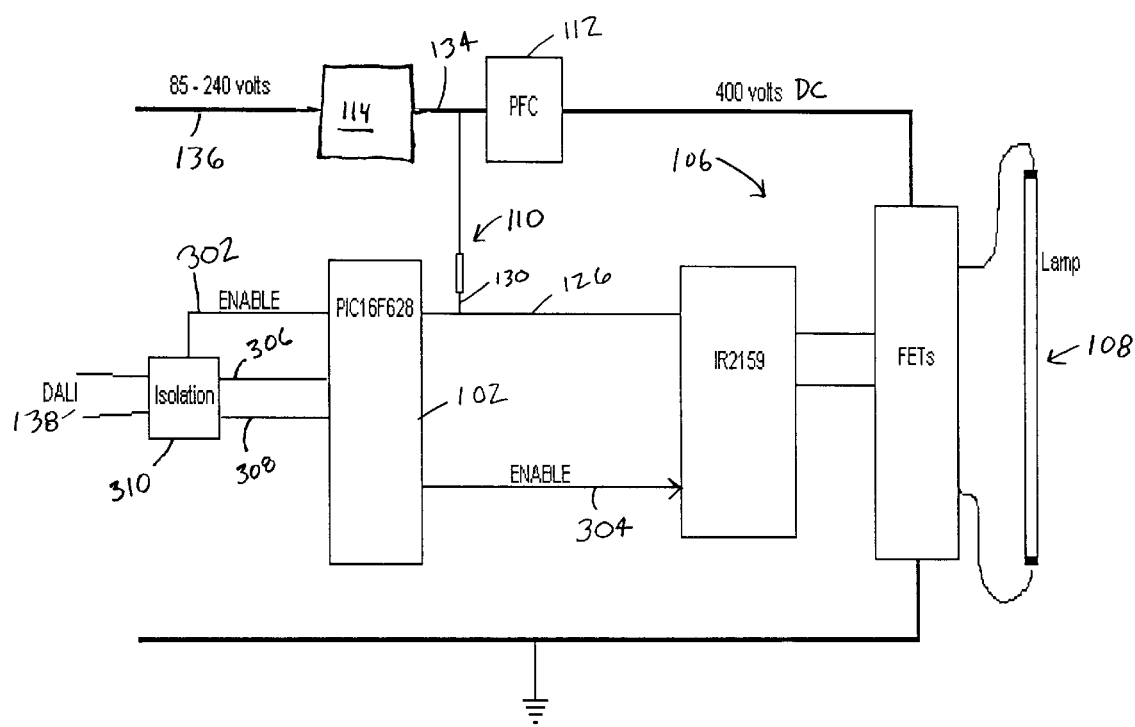
FIG. 3 illustrates a simplified schematic block diagram of the DALI compliant electrical system of FIG. 1.

Referring to FIG. 3, depicted is simplified schematic block diagram of the DALI compliant electrical system of FIG. 1. A source voltage on node 302 may be applied to isolation circuit 310. During the standby mode the source voltage from node 302 may be at a relatively high resistance so that very little current can flow though the isolation circuit 310. However, there is enough current flowing through the isolation circuit 310 so that a signal level transition may be detected on the DALI bus 138. When this signal level transition is detected, the processor 102 enables the power controller 106 on control line 304 and the power controller 106 supplies on node 126 whatever power the processor 102 requires. The processor 102 may also apply a low impedance source voltage from the node 302. Now the isolation circuit 310 may operate at maximum speed (ample available current for the isolation circuit 310) for detecting the serial DALI information signal on the DALI bus 138. Thus during the active mode, the processor 102 enables the power controller 106 on node 304 and the power controller 106 supplies power to the processor 102 on node 126. When in the standby mode, the power controller 106 is off and power to the processor is supplied through the standby power pickup 110 on node 130. The processor 102 may also be adapted to reduce its internal power usage by suspending or slowing down program instruction cycles.

Figure 4:
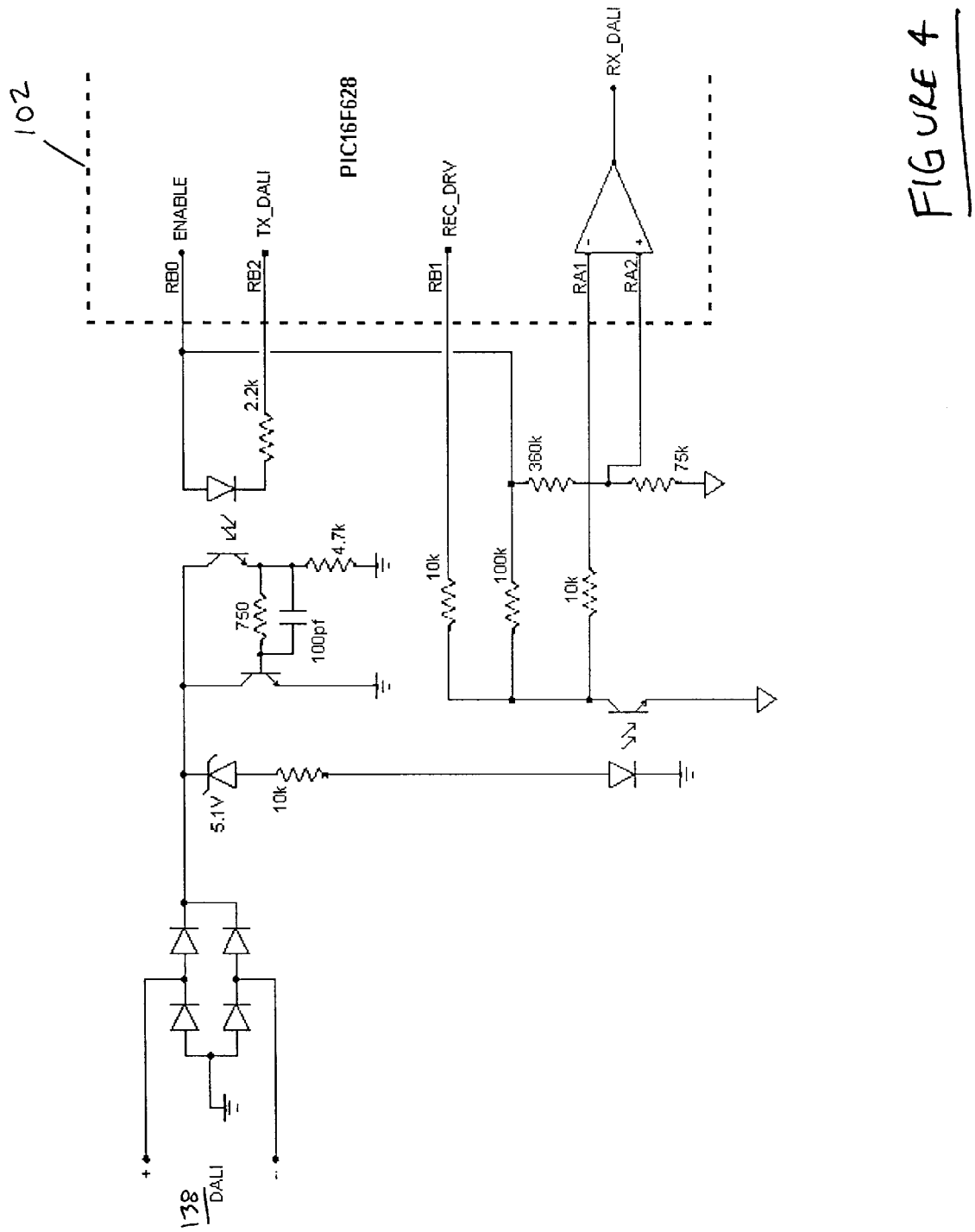
FIG. 4 illustrates a schematic circuit diagram of a portion of the DALI compliant electrical system depicted in FIGS. 1 and 2.

Referring to FIG. 4, depicted is a schematic circuit diagram of a portion of the DALI compliant electrical system depicted in FIGS. 1 and 2. When the processor 102 is in the standby mode, the REC_DRV at RB1 is at a high impedance. Thus there is a limited amount of current available to the opto-isolation transistor connected with the 10 kohm to RB1. When the DALI bus 138 has no signaling information (e.g., bus voltage remains high or active) the light emitting diode of the receive opto-isolator causes the corresponding transistor to turn on. However since there is a limited amount of current from the REC_DRV signal node RB1, this turn on occurs slowly. A comparator monitors the voltage (node RA1) across the emitter-collector of the transistor and when this voltage is less than the reference voltage at node RA2, the output of the comparator may be at a logic high (RX_DALI). When signal pulses start to occur on the DALI bus 138, the receive opto transistor starts to turn off and the voltage at node RA1 may be greater than the reference voltage at node RA2, than the output of the comparator may be at a logic low (RX_DALI). The processor 102 is adapted to switch from the standby mode to the active mode when a change in logic level occurs at RX_DALI.

Figure 5:
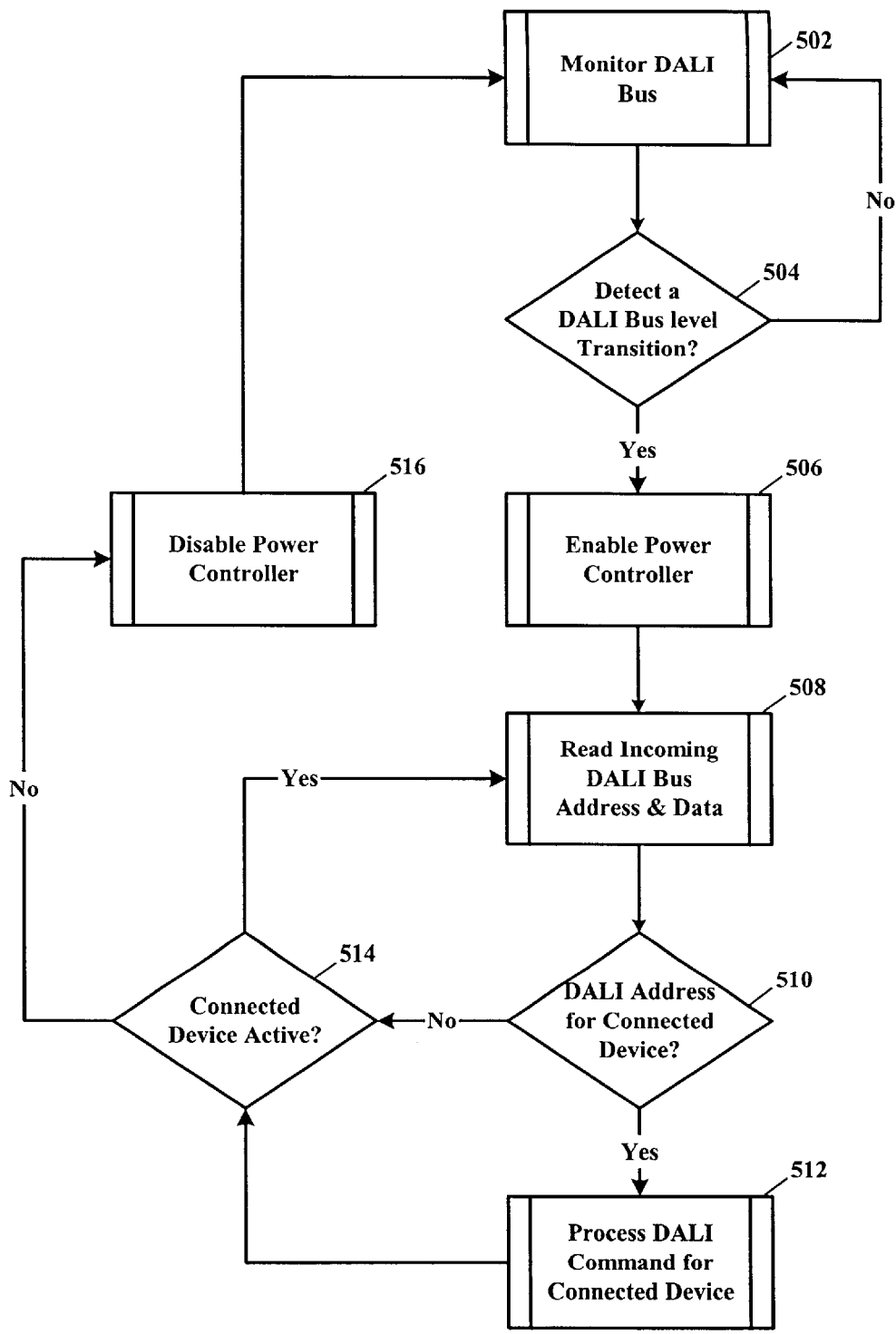
FIG. 5 illustrates a schematic flow diagram of the operation of an exemplary embodiment of the invention.

Referring to FIG. 5, depicted is a schematic flow diagram of the operation of an exemplary embodiment of the invention. The DALI bus 138 is monitored in step 502 until a bus level transition is detected in step 504. In step 506 the power controller 106 is enabled by the processor 102 and in step 508 the incoming DALI address and data is read by the processor 102 in combination with the DALI bus interface 104. A determination is made in step 510 whether the DALI address being sent is for the connected DALI device 108. If so, in step 512, the command for the connected DALI device 108 is processed. If not, step 514 determines whether the connected DALI device 108 is active or inactive. If the DALI device 108 is active, the power controller 106 is on and power is being supplied thereby to the processor 102. If the connected DALI device 108 is inactive in step 514, then in step 516 the power controller 106 is turned off by the processor 102. Once the power controller 106 is off, power for the processor 102 is supplied through the standby pickup 130 and the processor returns to the standby mode and the DALI bus 138 is monitored in step 502 until the next DALI bus level transition is detected in step 504.

Figure 6:
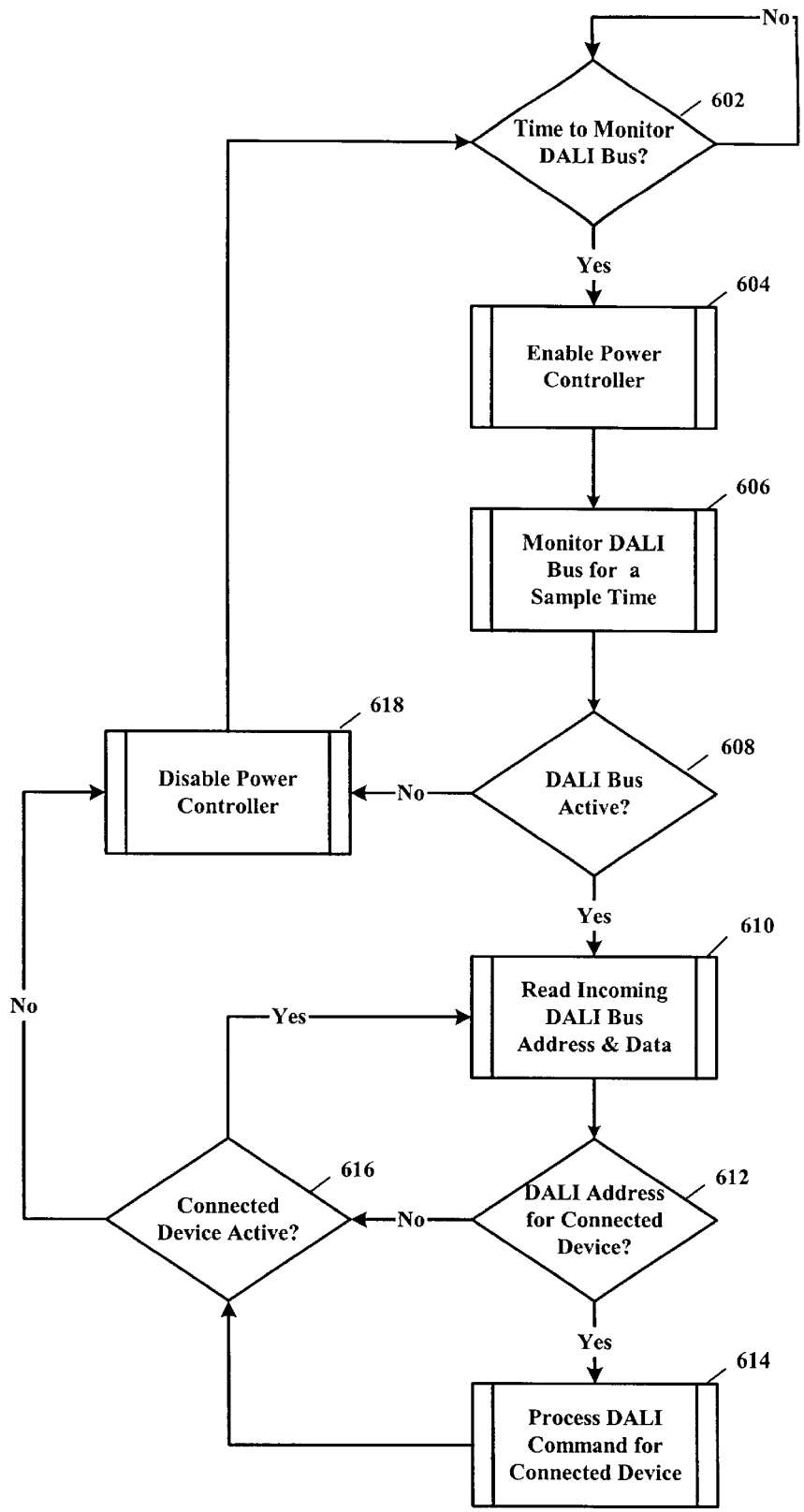
FIG. 6 illustrates a schematic flow diagram of the operation of another exemplary embodiment of the invention.

Referring to FIG. 6, depicted is a schematic flow diagram of the operation of another exemplary embodiment of the invention. The DALI bus 138 is periodically monitored (e.g., from about 10 microseconds to about 208 microseconds) in step 602 by turning on the power controller 106 for a short time, e.g., as little as 4–5 microseconds in step 604 (longer active mode times may be used with a corresponding increase in the power used be processor 102, however, only enough time is needed to determine whether the DALI bus 138 is active). The power controller 106 supplies power to the processor 102 which has switched from the standby mode to the active mode. In step 606, the processor 102 monitors the DALI bus 138 for incoming DALI address and data information. A determination is made in step 608 whether the DALI bus 138 is active. If not, the power controller 106 is turned off by the processor 102 until the next time period to monitor the DALI bus 138 occurs in step 602. If the DALI bus 138 is active, then in step 610 the incoming DALI address and data is read. A determination is made in step 612 whether the DALI address being sent is for the connected DALI device 108. If so, in step 614, the command for the connected DALI device 108 is processed. If not, step 616 determines whether the connected DALI device 108 is active or inactive. If the DALI device 108 is active, the power controller 106 is on and power is being supplied thereby to the processor 102. If the connected DALI device 108 is inactive in step 616, then in step 618 the power controller 106 is turned off by the processor 102. Once the power controller 106 is off, power for the processor 102 is supplied through the standby pickup 130 and the processor returns to the standby mode until the next time period to monitor the DALI bus 138 occurs in step 602.

The invention, therefore, is well adapted to carry out the objects and attain the ends and advantages mentioned, as well as others inherent therein. While the invention has been depicted, described, and is defined by reference to exemplary embodiments of the invention, such references do not imply a limitation on the invention, and no such limitation is to be inferred. The invention is capable of considerable modification, alternation, and equivalents in form and function, as will occur to those ordinarily skilled in the pertinent arts and having the benefit of this disclosure. The depicted and described embodiments of the invention are exemplary only, and are not exhaustive of the scope of the invention. Consequently, the invention is intended to be limited only by the spirit and scope of the appended claims, giving full cognizance to equivalents in all respects.

What is claimed is:

1. An apparatus for minimizing standby power in a digital addressable lighting interface (DALI), said apparatus comprising:

a power controller adapted for connection to a power source and an electrical device;

a processor coupled to said power controller, wherein said processor controls the operation of said power controller, whereby when said power controller is on said processor receives power therefrom;

a standby power pickup adapted for connection to the power source and connected to said processor, whereby said standby power pickup supplies power to said processor when said power controller is off; and a digital addressable lighting interface (DALI) bus interface adapted for connection to a DALI bus, said DALI bus interface is connected to said processor, wherein said processor is in a standby mode when said power controller is off and there is no signaling activity on the DALI bus, and said processor is in an active mode when said power controller is on or DALI information is detected on the DALI bus.

2. The apparatus of claim 1, wherein the DALI information is detected by said processor determining that a signal level change has occurred on the DALI bus.

3. The apparatus of claim 1, wherein said processor periodically turns on said power controller and checks the DALI bus for information.

4. The apparatus of claim 3, wherein said processor turns on said power controller for less time than a time period between checking the DALI bus for information.

5. The apparatus of claim 4, wherein said power controller is turned on for less than 75 percent of the time period between checking the DALI bus for information.

6. The apparatus of claim 4, wherein said power controller is turned on for less than 50 percent of the time period between checking the DALI bus for information.

7. The apparatus of claim 4, wherein said power controller is turned on for less than 25 percent of the time period between checking the DALI bus for information.

8. The apparatus of claim 4, wherein said power controller is turned on for less than ten percent of the time period between checking the DALI bus for information.

9. The apparatus of claim 4, wherein said power controller is turned on for less than five percent of the time period between checking the DALI bus for information.

10. The apparatus of claim 1, wherein said standby power pickup is a resistor.

11. The apparatus of claim 1, wherein said standby power pickup is a capacitor and diode.

12. The apparatus of claim 1, wherein said standby power pickup is an inductor and diode.

13. The apparatus of claim 1, wherein said standby power pickup is a step down transformer and diode.

14. The apparatus of claim 1, wherein said power controller includes a power rectifier adapted for coupling to the power source and for rectifying.

15. The apparatus of claim 1, further comprising a power factor correction circuit, said power factor correction circuit is adapted to improve the electrical device power factor.

16. The apparatus of claim 1, wherein said DALI bus interface comprises an optically isolated transmitter and receiver.

17. The apparatus of claim 1, wherein said processor supplies a low current signal to said DALI bus interface when in the standby mode.

18. The apparatus of claim 1, wherein said processor supplies a high current signal to said DALI bus interface when in the active mode.

19. An apparatus for minimizing standby power in a digital addressable lighting interface (DALI), said apparatus comprising:

a power controller adapted for connection to a power source and an electrical device;

a processor coupled to said power controller, wherein said processor controls the operation of said power controller, whereby when said power controller is on said processor receives power therefrom;

a standby power pickup adapted for connection to the power source and connected to said processor, whereby said standby power pickup supplies power to said processor when said power controller is off; and a digital addressable lighting interface (DALI) bus interface adapted for connection to a DALI bus, said DALI bus interface is connected to said processor, wherein said processor is in a standby mode when said power controller is off and there is no signaling activity on the DALI bus, and said processor is in an active mode when said power controller is on or when there is signaling activity on the DALI bus.

20. An apparatus for minimizing standby power in a digital addressable lighting interface (DALI), said apparatus comprising:

a power controller adapted for connection to a power source and an electrical device;

a processor coupled to said power controller, wherein said processor controls the operation of said power controller, whereby when said power controller is on said processor receives power therefrom;

a standby power pickup adapted for connection to the power source and connected to said processor, whereby said standby power pickup supplies power to said processor when said power controller is off; and a digital addressable lighting interface (DALI) bus interface adapted for connection to a DALI bus, said DALI bus interface is connected to said processor, wherein said processor is in a standby mode when said power controller is off, and said processor is in an active mode when said power controller is on or at periodic time intervals.

21. The apparatus of claim 1, wherein said processor is selected from the group consisting of a microcontroller, a microprocessor, a digital signal processor, a digital signal controller, an application specific integrated circuit (ASIC) and a programmable logic array (PLA).

22. A method for minimizing standby power in a digital addressable lighting interface (DALI), said method comprising the steps of:

providing a power controller adapted for connection to a power source and an electrical device;

controlling the operation of said power controller with a processor, wherein when said power controller is on said processor receives power therefrom;

providing power to said processor with a standby power pickup when said power controller is off, wherein said standby power pickup is adapted for connection to the power source;

providing a digital addressable lighting interface (DALI) bus interface adapted for connection to a DALI bus, said DALI bus interface being connected to said processor; and monitoring for signaling activity on the DALI bus, wherein said processor is in a standby mode when said power controller is off and there is no signaling activity on the DALI bus, and said processor is in an active mode when said power controller is on or there is signaling activity on the DALI bus.

23. The method of claim 22, wherein the step of detecting signaling activity on the DALI bus is the step of determining that a signal level change has occurred on the DALI bus.

24. The method of claim 22, wherein the step of detecting signaling activity on the DALI bus is the step of said processor periodically turning on said power controller and checking the DALI bus for information.

25. The method of claim 24, wherein said processor turns on said power controller for less time than a time period between checking the DALI bus for information.

26. The method of claim 25, wherein said power controller is turned on for less than 75 percent of the time period between checking the DALI bus for information.

27. The method of claim 25, wherein said power controller is turned on for less than 50 percent of the time period between checking the DALI bus for information.

28. The method of claim 25, wherein said power controller is turned on for less than 25 percent of the time period between checking the DALI bus for information.

29. The method of claim 25, wherein said power controller is turned on for less than ten percent of the time period between checking the DALI bus for information.

30. The method of claim 25, wherein said power controller is turned on for less than five percent of the time period between checking the DALI bus for information.

31. The method of claim 22, wherein said power controller includes a power rectifier adapted f or coupling to the power source and for rectifying.

32. The method of claim 22, further comprising the step of improve the electrical device power factor with a power factor correction circuit.

33. The method of claim 22, wherein said DALI bus interface comprises an optically isolated transmitter and receiver.

34. A system for minimizing standby power in a digital addressable lighting interface (DALI), said system comprising:

a power controller connected to a power source and an electrical device;

a processor coupled to said power controller, wherein said processor controls the operation of said power controller, whereby when said power controller is on said processor receives power therefrom;

a standby power pickup adapted for connection to the power source and connected to said processor, whereby said standby power pickup supplies power to said processor when said power controller is off; and a digital addressable lighting interface (DALI) bus interface connected to a DALI bus, said DALI bus interface is connected to said processor, wherein said processor is in a standby mode when said power controller is off and there is no signaling activity on the DALI bus, and said processor is in an active mode when said power controller is on or when there is signaling activity on the DALI bus.

35. An system for minimizing standby power in a digital addressable lighting interface (DALI), said system comprising:

a power controller connected to a power source and an electrical device;

a processor coupled to said power controller, wherein said processor controls the operation of said power controller, whereby when said power controller is on said processor receives power therefrom;

a standby power pickup connected to the power source and connected to said processor, whereby said standby power pickup supplies power to said processor when said power controller is off; and a digital addressable lighting interface (DALI) bus interface connected to a DALI bus, said DALI bus interface is connected to said processor, wherein said processor is in a standby mode when said power controller is off, and said processor is in an active mode when said power controller is on or at periodic time intervals.

36. The method of claim 34, wherein said processor is selected from the group consisting of a microcontroller, a microprocessor, a digital signal processor, a digital signal controller, an application specific integrated circuit (ASIC) and a programmable logic array (PLA).

37. The system of claim 34, wherein said electrical device is selected from the group consisting of an incandescent light, a fluorescent light, a high pressure gas electric discharge light, a low pressure gas electric discharge light, light emitting diode light and electroluminescent light.

38. The method of claim 22, wherein said electrical device is selected from the group consisting of an incandescent light, a fluorescent light, a high pressure gas electric discharge light, a low pressure gas electric discharge light, light emitting diode light and electroluminescent light.

39. The apparatus of claim 1, wherein said electrical device is selected from the group consisting of an incandescent light, a fluorescent light, a high pressure gas electric discharge light, a low pressure gas electric discharge light, light emitting diode light and electroluminescent light.

* * * * *